Baylies & Crawley,
Vise.
No. 3530.
Reissued July 6. 1869.
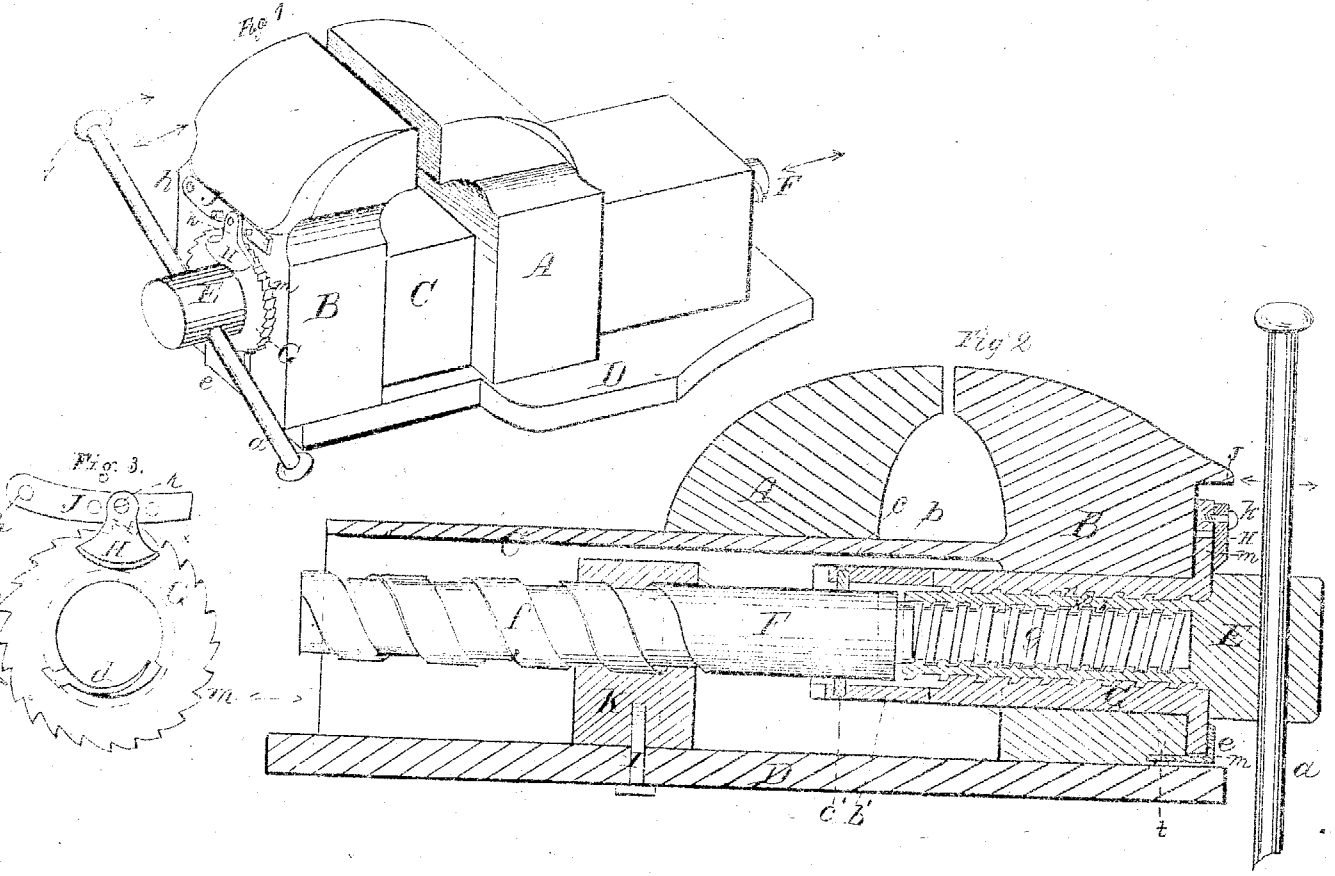
Witnesses
Saml F. Eskell
A. E. Brocker
Inventors
H. Baylies
Edwin Crawley
By Louis Bagger Atty.

United States Patent Office.

THOMAS L. BAYLIES AND EDWIN CRAWLEY, OF RICHMOND, INDIANA.

*Letters Patent No.* 82,073, *dated September* 15, 1868; *reissue No.* 3,530, *dated July* 6, 1869.

IMPROVEMENT IN VISES.

The Schedule referred to in these Letters Patent and making part of the same.

*To all whom it may concern:*

Be it known that we, THOMAS L. BAYLIES and EDWIN CRAWLEY, of Richmond, in the county of Wayne, and State of Indiana, have invented new and useful Improvements in Vises; and we do hereby declare that the following is a full, clear, and exact description of the same, reference being had to the annexed drawings, making part of this specification, in which—

Figure 1 is a perspective view.

Figure 2 is a longitudinal vertical section.

Figure 3 is a detached view of automatic devices.

The same letters, in the different figures, relate to corresponding parts of the invention.

Our invention relates to a combination of screws having threads of different inclination or pitch, and a spring or brake, whereby a continuation of the same operation that rapidly adjusts the jaws of a vise, also applies the pressure with greatly increased power, so that both operations may be performed with one hand by a continuous movement of the same device.

To enable others skilled in the art to make and use our invention, we will proceed to describe its construction and operation.

With reference to the drawings—

D is a bed-plate, and A and B are jaws, the former being stationary on plate D, and the latter movable.

C represents a box-slide passing through a correspondingly rectangular opening in jaw A, to which box or slide-jaw B is connected, and by which it is supported or maintained in its proper position with reference to jaw A.

F represents a screw-bolt, which is arranged within box C, on the ends of which are the screws *f* and *g*, having threads of different inclinations or pitches, the former being a right, and the latter a left-handed screw.

The coarse-pitch screw *f*, engages with nut K, the latter being secured by screw I, or it may be inserted between dovetailed projections formed upon the sides of bed-plate D.

G represents a sleeve, inserted through an orifice in jaw B, and which is provided with a flange, *m*, resting against the surface of jaw B, where it is secured by a right-angular plate, *e*, the latter being secured by a screw, *t*, to the under surface of said jaw.

E represents a hollow screw, provided with threads, both inside and out, the inside being a female screw for the male screw to enter, and the outside, a male screw, to enter the female screw in sleeve G. These screws are left-handed and differential. In this example, the threads of female screw G, and male screw E, are three to the inch, and the male screw *g* and female screw E, are four to the inch.

The sleeve G is provided with slots *b* and *b'* of sufficient breadth to admit the pins *c* and *c'* from shaft F, by which the latter is prevented from turning, excepting in conjunction with said sleeve.

*a* represents a lever inserted through an orifice in the enlarged end of screw E for turning the latter and operating the vise.

The flange *m*, of sleeve G, is provided with ratchet-teeth that operate in conjunction with pawl J during a certain movement of the mechanism.

The pawl J is pivoted on screw *k*.

H represents a pendent trigger, pivoted at *h* to the pawl J, by which the latter is held above the ratchet, when the shoulder of screw E is against the flange *m*.

*d* represents a spring, which, in this instance, acts as a brake for the purpose of producing friction between sleeve G and screw E, and is secured inside of sleeve G, in a suitable recess near its end, in any convenient manner.

The operation of the mechanism is as follows:

For adjusting the jaw B, the screw E is turned by means of lever *a*, in the ordinary manner of operating a single screw; the friction of spring *d* being sufficient to cause it to act as a brake, and to carry sleeve G with screw E, when no greater resistance is offered than occurs in adjusting the jaw.

The sleeve G, when turned, carries with it the bolt F, by reason of the pins *c* and *c'*, in slots *b* and *b'*, and as a consequence, the coarse-pitch screw only is used in adjusting the jaw B, the other screws retaining their relative positions while this adjustment is being made.

In the operation of clamping the article, the pressure is produced by continuing to turn lever *a*, and with it screw E, to the right.

The first resistance offered to the jaw, overcomes the effective action of friction-spring or brake *d*, thus permitting sleeve G to cease its rotary motion, and to remain in the position in which it happens to be, when released from the action of said spring or brake, as a consequence of which, screw *f* ceases to act when the further turning of screw E, in the same direction, will cause it to recede from the sleeve G at the rate of three-fourths of an inch for every three revolutions of such screw, and at the same time, by the same movement of the screw, the sleeve G will recede in the opposite direction one-fourth of an inch.

The jaw B being carried with sleeve G, it follows that it will be advanced, in the direction of the article to be held, at the same rate of speed with which the sleeve moves, and hence, that as the distance travelled through by such sleeve and jaw, is so much less than that traversed by the screw E in the same space of time, it follows that a large increase of griping or holding-force is produced as a consequence of this arrangement.

When the screw E has receded from the flange of sleeve G, a distance equal to the thickness of the trigger H, it drops between the shoulder of the head of the screw and flange *m*, and thus allows pawl J to fall and engage with the ratchet-teeth on flange *m*, thereby preventing sleeve G from turning to the left, and thus locking the adjusting-screw *f*. The outer edge of the bottom of trigger H is bevelled. Thus, when screw E is turned to the left, for the purpose of releasing the article under pressure, and withdrawing the jaw, the pressure of the shoulder of screw E, when it comes in contact with said trigger, lifts the latter, by which pawl J is raised and disengaged from the teeth of flange *m*.

Screw E being returned to its former position, with the shoulder against flange *m*, is then prevented from further turning, except in conjunction with sleeve G, and consequently screw *f*. The jaw is thus rapidly withdrawn.

The slots *b* and *b'*, in sleeve G, have length sufficient to admit of all necessary motion of said sleeve longitudinally on shaft F, which is equal to the yielding of the article under pressure.

Some modifications of this arrangement of screws may be easily effected, and yet operate in connection with the same or similar devices, one of which changes may be accomplished, the differential combination being dispensed with, by removing screw *g*, and boring the remainder of the screw-bolt F, the screw E, in that case, being made solid with a continuation of a smooth shaft extending through the bore of screw-bolt F, and projecting sufficiently beyond, to admit of its being secured there in some manner that will prevent its being withdrawn, and yet allow it to turn in screw-bolt F. Thus when no power is applied, more than is sufficient to adjust the jaw, the friction of the spring or brake *d* is sufficient to rotate sleeve G in conjunction with screw-bolt F, by which the coarse-pitch screw *f* is operated for the purpose of adjustment.

When resistance occurs from the pressure, screw *f* ceases to operate, and screw E is turned, as in the accompanying example, the jaw being thus advanced by the single screw E, according to the pitch of its thre ds. Thus the automatic advantages are obtained with a more simplified mechanism, and a corresponding loss of power.

Having thus described our invention,

What we claim, and desire to secure by Letters Patent, is—

1. In combination with the jaws of a vise, the series of screws having threads of a different pitch, and the spring or brake arranged to operate automatically in changing the speed, substantially as and for the purpose set forth.

2. Coupling the adjusting-screw and the sleeve G, by means of projections and recesses, by which they are made to revolve conjointly, and the sleeve G is allowed to move endwise, independently of the adjusting-screw, substantially as shown and described, and for the purpose set forth.

3. A pawl or cam, J, for locking sleeve G, when so arranged as to be automatically released by the boss on the screw E, substantially in the manner described and for the purpose set forth.

In testimony whereof, we have signed our names to this specification, before two subscribing witnesses.

THOMAS L. BAYLIES.
EDWIN CRAWLEY.

Witnesses:
JAMES A. MCMEANS,
WM. H. BRADBURY.